(12) United States Patent
Murakami

(10) Patent No.: US 12,480,788 B2
(45) Date of Patent: Nov. 25, 2025

(54) DISPLACEMENT DETECTING SENSOR, CONTROL DEVICE, AND CONTROL SYSTEM

(71) Applicant: FANUC CORPORATION, Yamanashi (JP)

(72) Inventor: Kunihiko Murakami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 306 days.

(21) Appl. No.: 18/256,206

(22) PCT Filed: Jan. 21, 2022

(86) PCT No.: PCT/JP2022/002249
§ 371 (c)(1),
(2) Date: Jun. 7, 2023

(87) PCT Pub. No.: WO2022/163536
PCT Pub. Date: Aug. 4, 2022

(65) Prior Publication Data
US 2024/0019278 A1    Jan. 18, 2024

(30) Foreign Application Priority Data
Jan. 28, 2021  (JP) ................. 2021-011910

(51) Int. Cl.
*G01D 5/12*   (2006.01)
*B25J 13/08*  (2006.01)
*G01D 5/26*   (2006.01)

(52) U.S. Cl.
CPC ............. *G01D 5/26* (2013.01); *B25J 13/088* (2013.01); *G01D 5/12* (2013.01)

(58) Field of Classification Search
CPC ........... G01D 2205/80; G01D 2205/85; G01D 2205/90
(Continued)

(56) References Cited

U.S. PATENT DOCUMENTS 3,600,811 A * 8/1971 Weyrauch ............ G01B 11/002
                                                      33/1 M
4,119,212 A * 10/1978 Flemming ................ B25J 17/02
                                                       414/730
(Continued)

FOREIGN PATENT DOCUMENTS

JP   S61-125786 A   6/1986
JP   S64-045592 A   2/1989
(Continued)

*Primary Examiner* — George B Bennett
(74) *Attorney, Agent, or Firm* — HAUPTMAN HAM, LLP

(57) ABSTRACT

This displacement detecting sensor is provided with two encoders attached to a first link and a second link that are coupled in such a way as to be capable of moving relative to a certain axis, wherein: the two encoders are provided with two scale members at different distances from the axis, and two detectors for detecting scales on the respective two scale members; a positional relationship between the scale members and the detectors changes in accordance with an external force accepted at the distal end of the second link, generating a difference between the two scales detected by the two encoders; and the displacement of the distal end of the second link can be detected on the basis of the two scales.

10 Claims, 8 Drawing Sheets

(58) Field of Classification Search
USPC .................................. 33/1 PT, 707, 708, 706
See application file for complete search history.

(56) References Cited

U.S. PATENT DOCUMENTS

| | | | | |
|---|---|---|---|---|
| 4,571,834 | A * | 2/1986 | Fraser | A61B 5/4528 600/595 |
| 4,575,581 | A * | 3/1986 | Langberg | G06F 3/03548 178/18.05 |
| 5,163,228 | A * | 11/1992 | Edwards | G01B 3/56 33/465 |
| 5,456,020 | A * | 10/1995 | Kellner | G01D 5/34 33/706 |
| 5,743,020 | A * | 4/1998 | Sheldon | G01B 5/012 33/559 |
| 6,327,791 | B1 * | 12/2001 | Norcross | F15B 15/2876 33/710 |
| 6,931,745 | B2 * | 8/2005 | Granger | G01B 5/008 33/503 |
| 7,568,293 | B2 * | 8/2009 | Ferrari | G01B 5/008 33/503 |
| 8,919,004 | B2 * | 12/2014 | Wu | G01B 21/16 33/501.45 |
| 9,303,968 | B2 * | 4/2016 | Mori | G01B 5/20 |
| 11,697,209 | B1 * | 7/2023 | Mourlam | B66F 11/046 700/255 |
| 12,296,485 | B2 * | 5/2025 | Hansen | G05B 19/423 |
| 2016/0178396 | A1 | 6/2016 | Kolbenschlag | |
| 2022/0395986 | A1 * | 12/2022 | Blank | H01L 21/67766 |
| 2024/0019278 | A1 * | 1/2024 | Murakami | G01B 21/22 |

FOREIGN PATENT DOCUMENTS

| | | |
|---|---|---|
| JP | 2010-269412 A | 12/2010 |
| JP | 2011-152633 A | 8/2011 |
| JP | 2012-016799 A | 1/2012 |
| JP | 2016-003947 A | 1/2016 |

\* cited by examiner

DISPLACEMENT DETECTING SENSOR, CONTROL DEVICE, AND CONTROL SYSTEM

RELATED APPLICATIONS

The present application is a National Phase of International Application No. PCT/JP2022/002249 filed Jan. 21, 2022, which claims priority to Japanese Application No. 2021-011910, filed Jan. 28, 2021.

FIELD

The present invention relates to machine control, and in particular, relates to a displacement detection sensor which can detect displacement of a machine tip, as well as a controller and a control system.

BACKGROUND

Machines such as industrial robots and machine tools comprise a plurality of links which are connected so as to enable movement relative to each other. In applications where machining is performed by installing a machining tool or workpiece on the tip of the machine, since the machine tip receives external forces, the position of the machine tip changes due to bending of the links and twisting of the link joints caused by the external forces. Since the displacement of the machine tip directly impacts machining accuracy, a machine with a small displacement due to external forces is required. There is known a technology which eliminates the effects of twisting of the joints, backlash, etc., by controlling the position of the output shaft with an encoder attached to the output shaft of the joint. However, when controlling the position of an output shaft with an encoder attached to the output shaft, it is not possible to respond to displacement of the machine tip due to bending of the links on the tip side from the joints. Technologies related to the present application are known in, for example, the following literature.

Patent Literature 1 discloses a robot arm which comprises a main arm which bears the main load, a sub arm which comprises a fixed end affixed to a base side of the main arm and a free end extending to the tip side of the main arm, and a displacement detector which is attached to the free end side and which detects deflection of the main arm caused by the load, wherein the tip of the arm is positioned by correcting deflection using a displacement detector.

Patent Literature 2 describes an articulated robot, wherein in addition to a rotation angle detector of an electric motor which drives rotating arms, angle detectors for detecting the actual angle between the rotating arms are attached to each joint, either directly or via a speed-increasing gear.

Patent Literature 3 describes an encoder device comprising two encoders, wherein a first scale attached to a first shaft and a second scale attached to a second shaft are arranged adjacent to each other, and the second scale comprises a light transmitting part for detecting the first scale.

CITATION LIST

Patent Literature

[PTL 1] JP 1986(S61)-125786 A
[PTL 2] JP 1989(S64)-045592 A
[PTL 3] JP 2016-003947 A

SUMMARY

Technical Problem

The present invention has been conceived in light of the problems of the prior art, and an object thereof is to provide a technology for accurately detecting displacement of a machine tip.

Solution to Problem

An aspect of the present disclosure provides a displacement detection sensor, comprising two encoders which are attached to a first link and a second link, which are connected so as to be capable of moving relative to each other with respect to a predetermined axis, wherein the two encoders comprise two scale members having different distances from the axis, and two detectors for detecting respective scales of the two scale members, and positional relationships between the scale members and the detectors change depending on external force received by a tip of the second link, causing a difference between the two scales detected by the two encoders, whereby displacement of the tip of the second link can be detected based on the two scales.

Another aspect of the present disclosure provides a controller which controls a machine comprising a plurality of links to which the displacement detection sensor described above is attached, comprising an operation command creation unit which creates operation commands for the machine based on a correction depending on the displacement of the respective tips of the plurality of links.

Yet another aspect of the present disclosure provides a control system, comprising the displacement detection sensor described above, a machine comprising a plurality of links to which the displacement detection sensor is attached, and a controller for controlling the machine, wherein the controller comprises an operation command creation unit which creates operation commands for the machine based on a correction amount depending on the displacement of the respective tips of the plurality of links.

Advantageous Effects of Invention

According to the aspects of the present disclosure, displacement of a machine tip can more accurately be detected.

DESCRIPTION OF EMBODIMENTS

Figure 1:
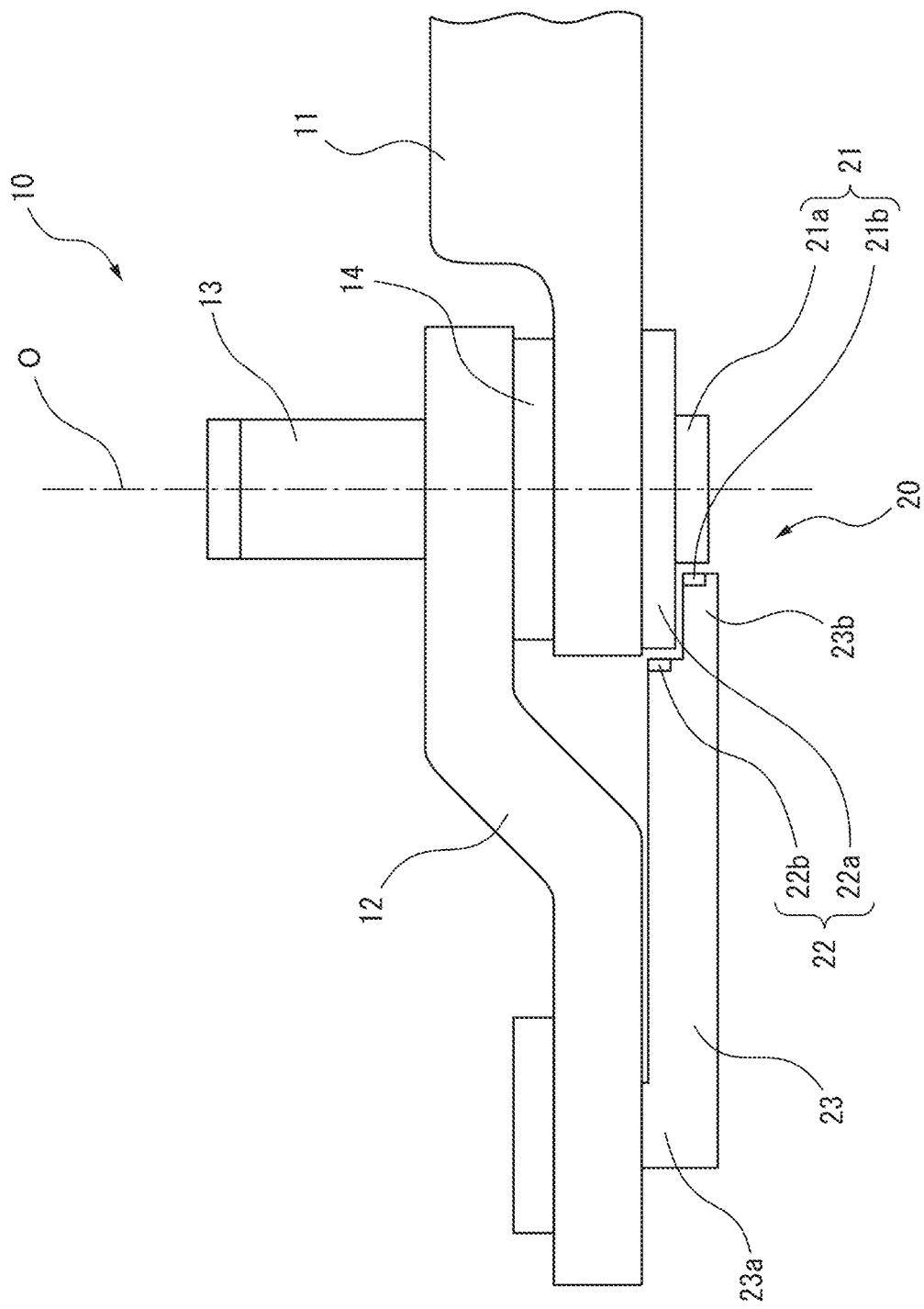
FIG. 1 is a top view of a machine showing a displacement detection sensor of a first embodiment.

The embodiments of the present disclosure will be described in detail below with reference to the attached drawings. In the drawings, identical or similar constituent elements have been assigned the same or similar reference signs. Furthermore, the embodiments described below do not limit the technical scope of the invention described in the claims or the definitions of the terms.

Figure 2:
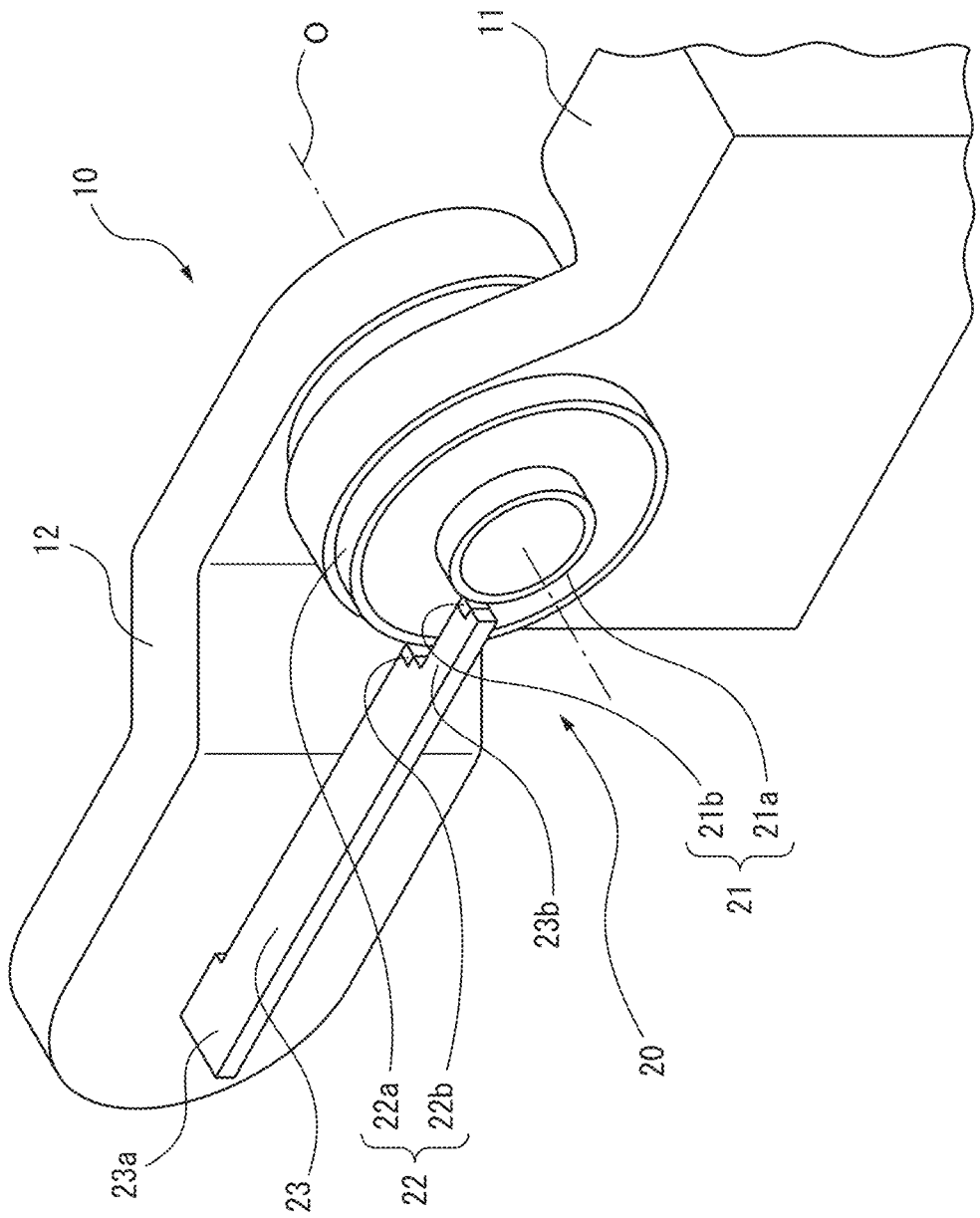
FIG. 2 is a perspective view of a machine showing the displacement detection sensor of the first embodiment.

FIGS. 1 and 2 are a top view and a perspective view, respectively, of a machine 10 showing a displacement detection sensor 20 of a first embodiment. The machine 10 is, for example, a machine such as an industrial robot or a machine tool. The machine 10 comprises a first link 11 and a second link 12 which are connected so as to be capable of moving relative to each other about an axis O. A displacement detection sensor 20 is attached to the first link 11 and the second link 12. The first link 11 and the second link 12 are connected so as to be capable of rotating about, for example, the axis O. The second link 12 is driven by an actuator. The actuator is, for example, a motor 13 and speed reducer 14. The actuator may be composed of a direct motor without a speed reducer.

The displacement detection sensor 20 comprises two encoders 21, 22 attached to the first link 11 and the second link 12. The two encoders 21, 22 are, for example, rotary encoders which detect relative angles of the first link 11 and the second link 12. The two encoders 21, 22 are, for example, optical encoders, but may be other types of encoders, such as magnetic encoders. The two encoders 21, 22 comprise two scale members 21a, 22a having different distances from the axis O to the detection position, and detectors 21b, 22b for detecting the scales of the two scale members 21a, 22a. The two scale members 21a, 22a are, for example, two ring-shaped members having different diameters, and are arranged on concentric circles about the axis O. The two detectors 21b, 22b are arranged at positions facing the two scale members 21a, 22a, respectively.

It is preferable that the displacement detection sensor 20 further comprise a base member 23 which supports the two detectors 21b, 22b. The base member 23 is, for example, a rod-shaped member, and comprises a fixed end 23a which is affixed to the tip of the second link 12 and a free end 23b which is arranged at the joint of the first link 11 and the second link 12 and which is not constrained. The detectors 21b, 22b are attached to the free end 23b of the base member 23, and the scale members 21a, 22a are affixed to the first link 11. As a result, the positional relationship between the scale members 21a, 22a and the detectors 21b, 22b changes in accordance with the external force received by the tip of the second link 12, which causes a difference between the two scales detected by the two encoders 21, 22.

Figure 3:
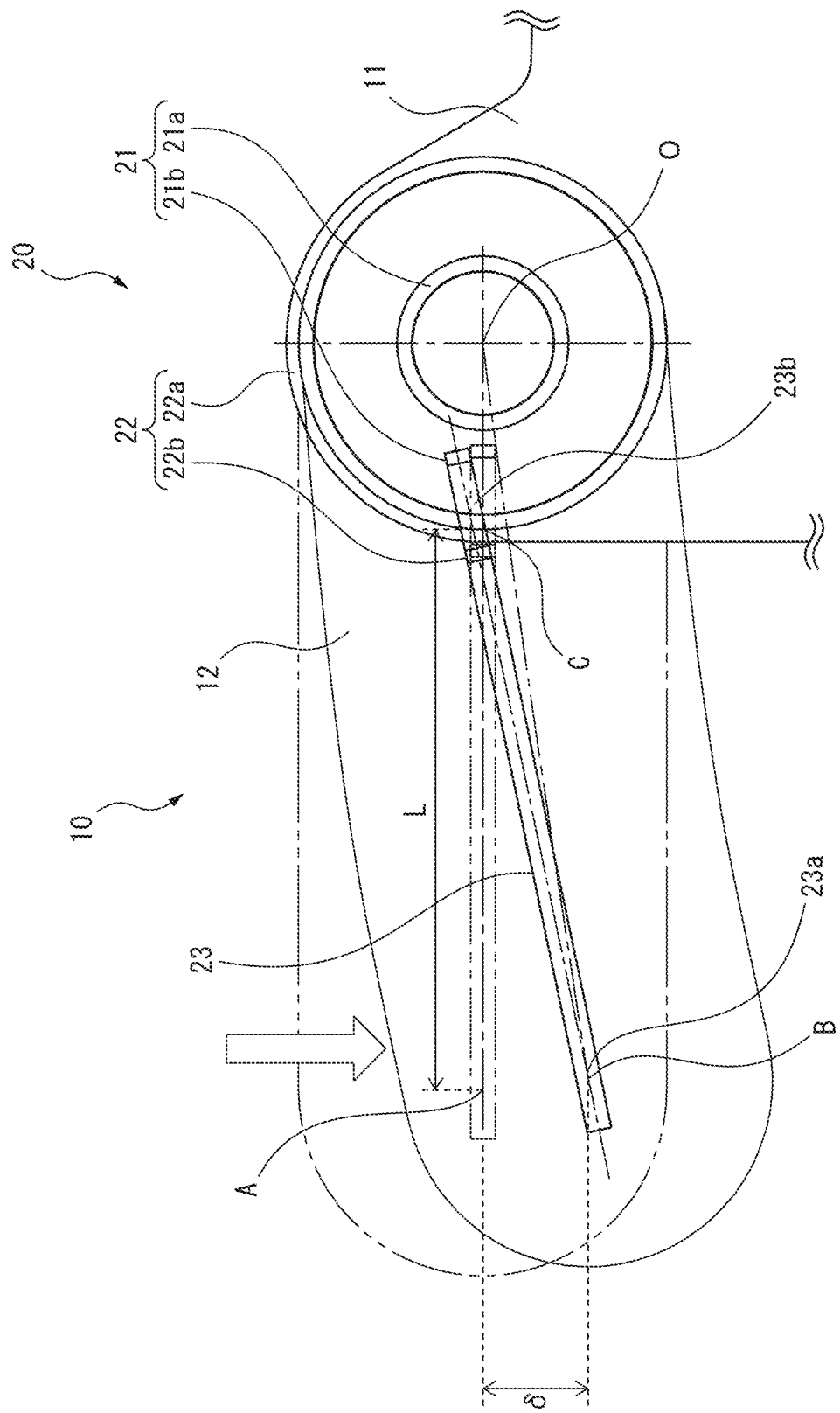
FIG. 3 is a side view of a machine showing the displacement detection sensor of the first embodiment.

FIG. 3 is a side view of the machine 10 showing the displacement detection sensor 20 of the first embodiment. In this drawing, the second link 12 before receiving the external force is illustrated with a double-dashed line, and the second link 12 that has bent under the external force is illustrated with a solid line. When the tip of the second link 12 receives an external force as indicated by the arrow, the tip of the second link 12 (the fixed end 23a of the base member 23) moves from position A to position B due to bending of the second link 12, twisting of the link joint, etc. Specifically, the tip of the second link 12 is displaced by δ. Though the fixed end 23a of the base member 23 is affixed to the tip of the second link 12, since the free end 23b is not constrained, the base member 23 itself does not deform (i.e., does not bend). Thus, the positional relationship between the detectors 21b, 22b and the scale members 21a, 22a changes by the amount of displacement δ of the tip of the second link 12, resulting in a difference between the two scales detected by the two encoders 21, 22.

Figure 4:
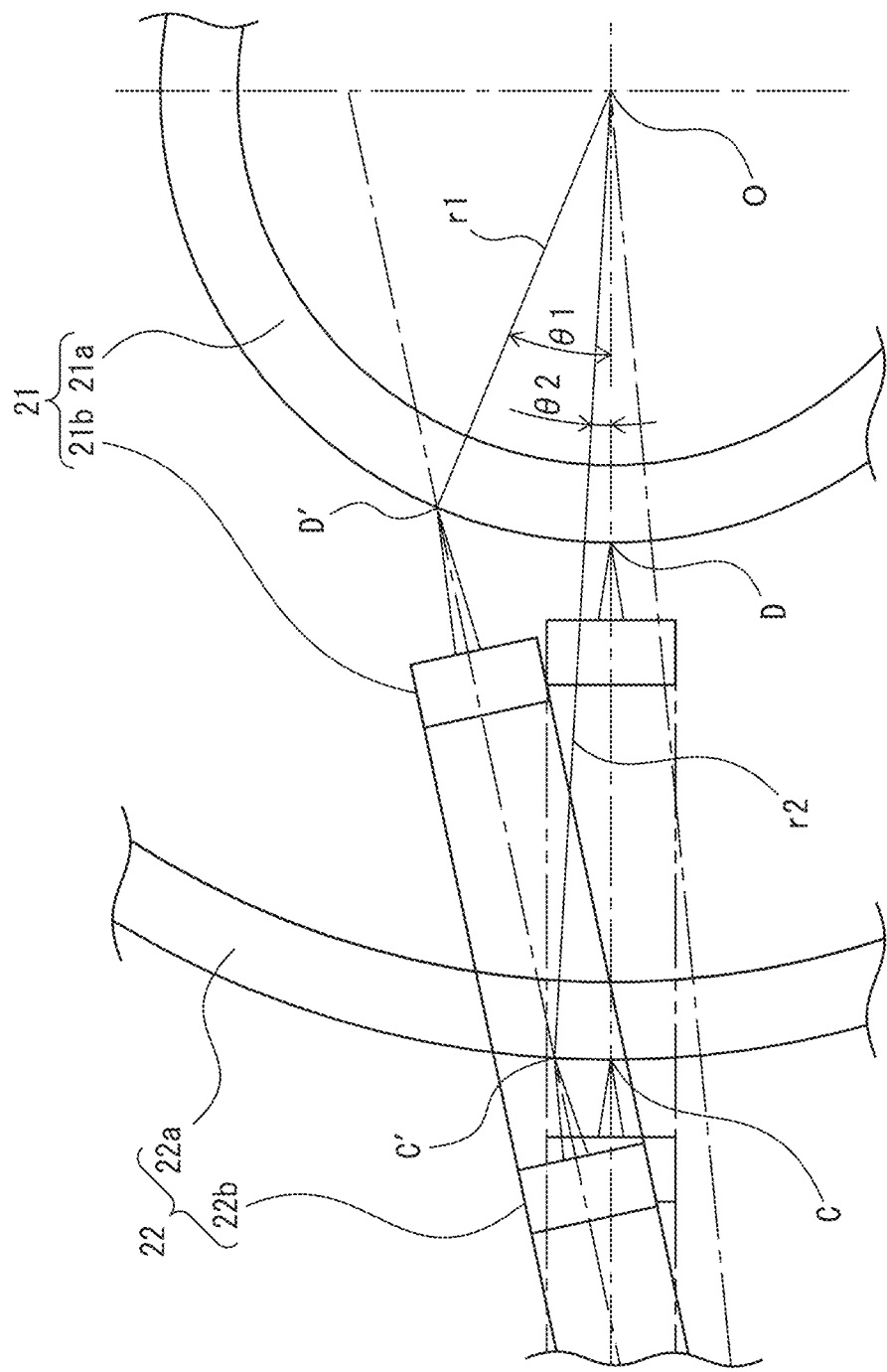
FIG. 4 is an enlarged view of a part of the displacement detections sensor shown in FIG. 3.

FIG. 4 is an enlarged view of part of the displacement detection sensor 20 shown in FIG. 3. The positional relationship between the detectors 21b, 22b and the scale members 21a, 22a changes depending on the displacement δ of the tip of the second link 12, and a difference occurs between the two scales detected by the two encoders 21, 22, i.e., the two angles θ1, θ2. The two angles θ1, θ2 are the angular changes before and after the application of the external force. The displacement detection sensor 20 can detect the displacement δ of the tip of the second link 12 based on the two angles θ1, θ2.

The displacement detection sensor 20 may further comprise a displacement calculation unit (not illustrated) which calculates the displacement δ of the tip of the second link 12 based on the two angles θ1, θ2 as well as two different distances r1, r2 from the axis O to the detection positions C, D (or C', D') of the two scale members 21a, 22a (refer to FIG. 4), and distance L from the tip of second link 12 (the fixed end 23a of the base member 23) to the detection position C of scale member 22a (refer to FIG. 3). Since r1, r2 are the radii of the scale members 21a, 22a, respectively, and L is the distance from the fixed end 23a of the base member 23 before the application of the external force to the detection position C of the scale member 22a, r1, r2 and L are known values. Though not illustrated, the displacement calculation unit is, for example, a computer device comprising a processor for executing programs, memory, an input/output unit, etc., and it may be composed of a semiconductor integrated circuit such as an FPGA (field-programmable gate array) or an ASIC (application-specific integrated circuit) which does not execute programs.

Figure 5:
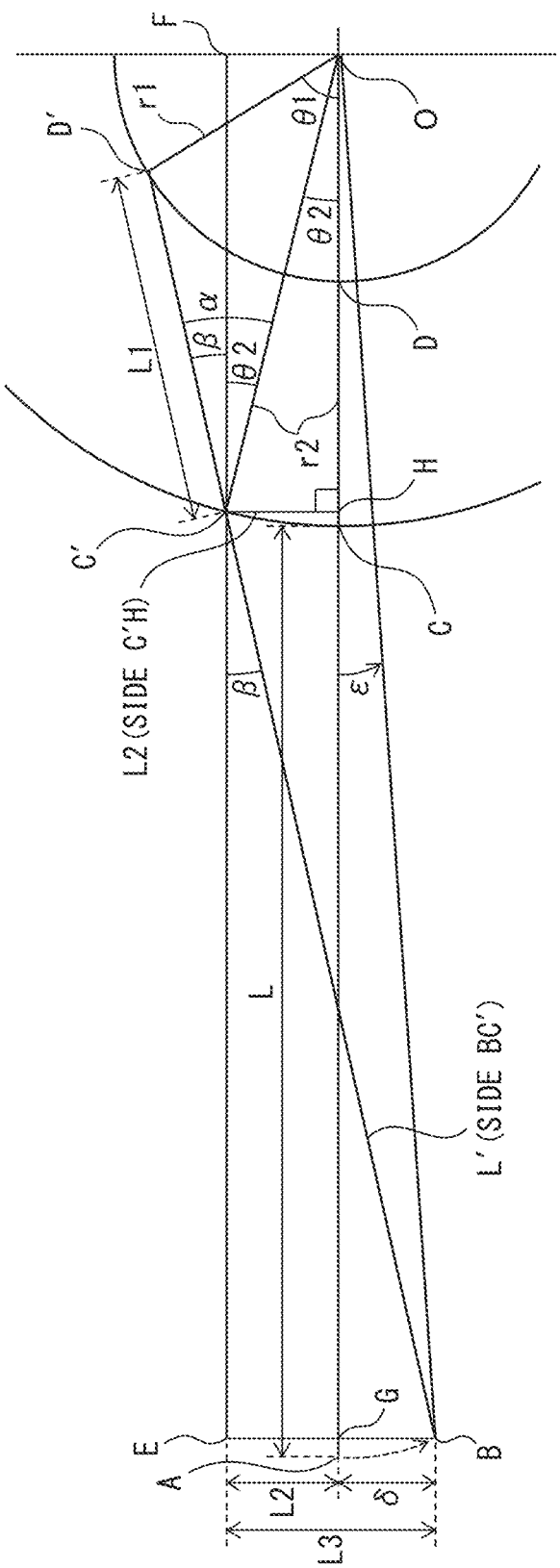
FIG. 5 is a geometric diagram showing an example of calculation of link tip displacement.

FIG. 5 is a geometric diagram showing an example of calculation of the displacement δ of the link tip. First, the displacement detection sensor 20 stores the known values r1, r2, L and the scales of the two encoders 21, 22 prior to the application of the external force in a memory. The displacement detection sensor 20 then acquires the two angles θ1, θ2 by acquiring the scales of the two encoders 21, 22 after the application of the external force.

In FIG. 5, when a line segment EF which is parallel to the line segment AC, which connects the position A (the position of the fixed end of the base member) of the tip of the second link prior to the application of the external force and the detection position C of the scale member, and which passes through the detection position C' of the scale member after the application of the external force is drawn, a perpendicular line BE from the position B of the fixed end of the base member after the application of the external force to the line segment EF is drawn, the intersection of the line segment AC and perpendicular line BE is defined as G, the length of line segment EG is defined as L2, and the length of perpendicular line BE is defined as L3, the displacement δ of the tip of the second link can be expressed by the following formula.

[Math 1]

$$\delta = L3 - L2 \qquad 1$$

When the angle ∠BC'E of the base member after the application of the external force is defined as β, and the length of the side BC' from the position B of the fixed end of the base member to the detection position C' of the scale member is defined as L', L3 can be expressed by the following formula.

[Math 2]

$$L3 = L' \times \sin\beta \qquad 2$$

Regarding L', since the distance between the scale member and the detector changes slightly after the application of the external force, when this amount of change is defined as ΔL, the length L' of the side BC' is expressed as L'=L+ΔL. Since ΔL is sufficiently smaller than L, it can be approximated as L'=L. Thus, L3 can be further expressed by the following formula.

[Math 3]

$$L3 = L \times \sin\beta \qquad 3$$

Since L2 is equal to the length of side C'H, which is a perpendicular line drawn from the detection position C' of the scale member to the line segment AO, it can be expressed by the following formula from the angle θ2 and the radius r2 of the scale member.

[Math 4]

$$L2 = r2 \times \sin\theta2 \qquad 4$$

When β, which is not a known value, is determined from formulas 3 and 4, the displacement δ of the tip of the second link can be determined. Here, when ∠D'C'O is α, β can be expressed by the following formula.

[Math 5]

$$\beta = \alpha - \theta2 \qquad 5$$

When α, which is not a known value, is determined from formula 5, the displacement δ of the tip of the second link can be determined. Focusing on ΔOC'D', when the length of the side C'D' is defined as L1, α can be expressed by the following formula from the law of cosines.

[Math 6]

$$\alpha = a\cos\left(\frac{L1^2 + r2^2 - r1^2}{2 \times L1 \times r2}\right) \qquad 6$$

When L1, which is not a known value, is determined from formula 6, the displacement δ of the tip of the second link can be determined. Further focusing on ΔOC'D', since the length of the side OD' is r1, the length of the side OC' is r2, and the angle ∠C'OD' between these two sides is the difference between the two angles θ1, θ2, L1 can be expressed by the following formula from the law of cosines.

[Math 7]

$$L1 = \sqrt{r1^2 + r2^2 - 2 \times r1 \times r2 \times \cos(\theta1 - \theta2)} \qquad 7$$

Since r1, r2, θ1, and θ2 are known, the displacement δ of the tip of the second link can be determined.

When correcting the displacement δ of the tip of the second link, it is necessary to rotate the second link about axis O from position B to position A. When this rotation angle is defined as a correction amount c, the displacement calculation unit may further calculate the correction amount ε for correcting the displacement δ of the tip of the second link. The correction amount c can be expressed by the following formula.

[Math 8]

$$\varepsilon = a\tan\left(\frac{\delta}{\text{Side GO}}\right) \qquad 8$$

Side GO is the sum of side EC' and side C'F. Focusing on ΔBC'E, side EC' can be expressed by the following formula.

[Math 9]

$$\text{Side } EC' = L \times \cos\beta \qquad 9$$

Focusing on ΔC'OF, side C'F can be expressed by the following formula.

[Math 10]

$$\text{Side } C'F = r2 \times \cos\theta2 \qquad 10$$

The correction amount c can be calculated from formulas 9 and 10.

Figure 6:
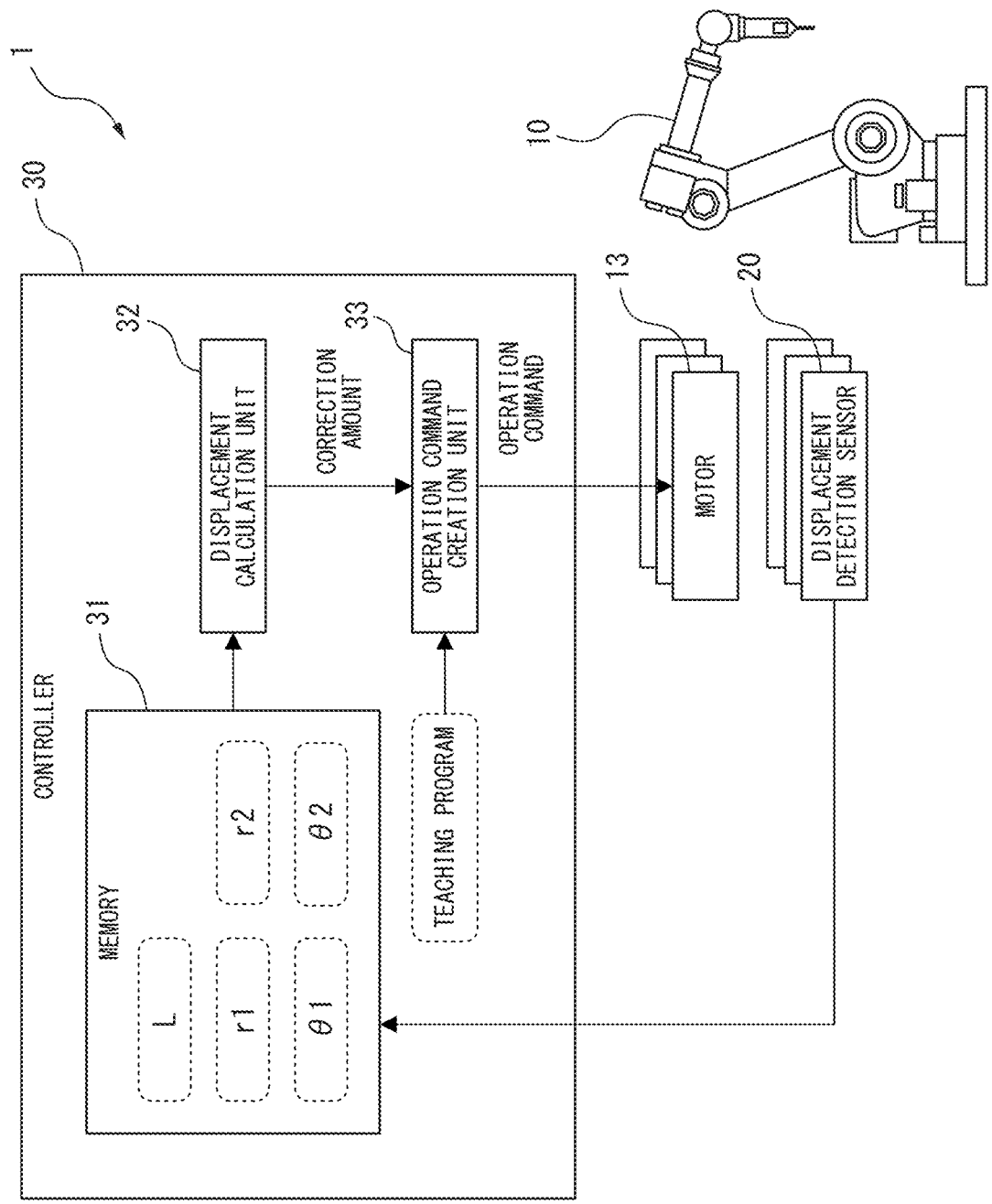
FIG. 6 is a block diagram of a control system of the first embodiment.

FIG. 6 is a block diagram of a control system 1 of the first embodiment. The control system 1 comprises displacement detection sensors 20, the machine 10 comprising a plurality of links to which the displacement detection sensors 20 are attached, and a controller 30 for controlling the machine 10. The machine 10 is, for example, a vertically articulated robot. The machine 10 comprises a motor 13 and a displacement detection sensor 20 at each joint of the plurality of links. The displacement detection sensor 20 is, for example, a rotary encoder. The displacement detection sensor 20 enables detection of the displacement δ of each tip of the plurality of links. If the displacement δ of each tip of the plurality of links is corrected, the displacement of the tip of the machine 10 can be corrected.

The controller 30 comprises an operation command creation unit 33 which creates operation commands for the machine 10 in accordance with a teaching program. The operation commands for the machine 10 include, for example, position commands, speed commands, and torque commands for the motor 13. The operation command creation unit 33 creates operation commands for the machine 10 based on the correction amount c in accordance with the displacement δ of each tip of the plurality of links. The operation command creation unit 33 is composed of, for example, a controller for controlling the motor 13, an amplifier, etc.

The controller 30 may further comprise a memory 31 which stores θ1, θ2, r1, r2, and L, and a displacement calculation unit 32 which calculates the displacement δ of each tip of the plurality of links based on θ1, θ2, r1, r2, and L. The displacement calculation unit 32 is, for example, a computer device comprising a processor, memory, input/output unit, etc., for executing programs, and may be composed of a semiconductor integrated circuit such as an FPGA (field-programmable gate array) or an ASIC (application-specific integrated circuit) which does not execute programs. When the controller 30 comprises the displacement calculation unit 32, the displacement detection sensor 20 need not comprise a displacement calculation unit. In this case, the displacement detection sensor 20 should output, to the controller 30, the two angles θ1, θ2 detected by the two encoders in accordance with the external force received by the tip of the machine 10.

It is preferable that the displacement calculation unit 32 further calculate for each link a correction amount c for correcting the displacement δ of each tip of the plurality of links. The operation command creation unit 33 creates operation commands for the machine 10 based on these correction amounts E.

Note that the configurations and operations of the displacement detection sensor 20, the controller 30, and the control system 1 of the first embodiment are examples, and can be appropriately changed. For example, the base member 23 may support the two scale members 21a, 22a instead of supporting the two detectors 21b, 22b. Specifically, the scale members 21a, 22a may be attached to the free end 23b of the base member 23, and the detectors 21b, 22b may be affixed to the first link 11. For example, the machine 10 may comprise the base member 23 instead of the displacement detection sensor 20 comprising the base member 23.

The first link 11 and the second link 12 may be connected so as to be capable of translating along the axis instead of being connected so as to be rotatable about the axis O. Specifically, the two encoders 21, 22 may be linear encoders rather than rotary encoders.

Figure 7:
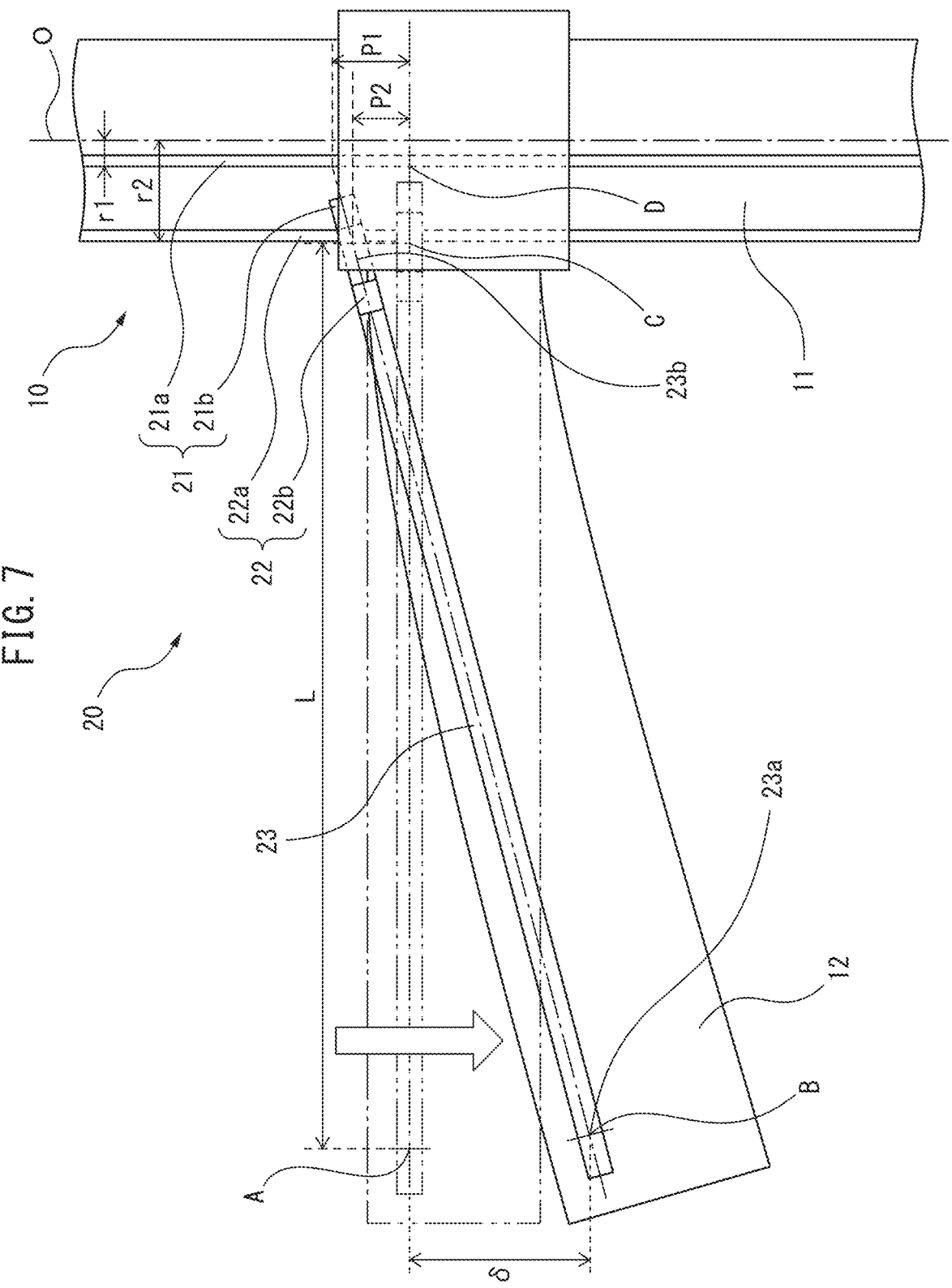
FIG. 7 is a side view of a machine showing a displacement detection sensor of a second embodiment.

FIG. 7 is a side view of the machine 10 showing the displacement detection sensor 20 of a second embodiment. Only the configurations and operations which are different from those of the displacement detection sensor 20 of the first embodiment will be described below. The first link 11 and the second link 12 are connected, for example, so as to be capable of translating along the axis O. The encoders 21, 22 are, for example, linear encoders which detect the relative positions of the first link 11 and the second link 12. The two scale members 21a, 22a are, for example, two linear members having different distances from the axis O to the detection position, and are arranged on lines parallel to the axis O. The two detectors 21b, 22b are arranged at positions facing the two scale members 21a, 22a, respectively. The detectors 21b, 22b are attached to the free end 23b of the base member 23, and the scale members 21a, 22a are affixed to the first link 11. As a result, the positional relationship between the scale members 21a, 22a and the detectors 21b, 22b changes in accordance with the external force received by the tip of the second link 12, causing a difference between the two scales detected by the two encoders 21, 22.

The positional relationship between the detectors 21b, 22b and the scale members 21a, 22a changes depending on the displacement δ of the tip of the second link 12, and a difference occurs between the two scales detected by the two encoders 21, 22, i.e., the two positions P1, P2. The two positions P1, P2 are position changes before and after the application of the external force. The displacement detection sensor 20 can detect the displacement δ of the tip of the second link 12 based on the two positions P1, P2.

It is preferable that the displacement detection sensor 20 further comprise a displacement calculation unit (not illustrated) which calculates the displacement δ of the tip of the second link 12 based on the two positions P1, P2 as well as two different distances r1, r2 from the axis O to the detection positions C, D of the two scale members 21a, 22a, and distance L from the tip of second link 12 (the fixed end 23a of the base member 23) to the detection position C of scale member 22a. Since r1 and r2 are the distances from the axis O to detection positions C and D of the scale members 21a, 22a, respectively, and L is the distance from the fixed end 23a of base member 23 prior to the application of the external force to the detection position C of the scale member 22a, r1, r2, and L are known values.

Figure 8:
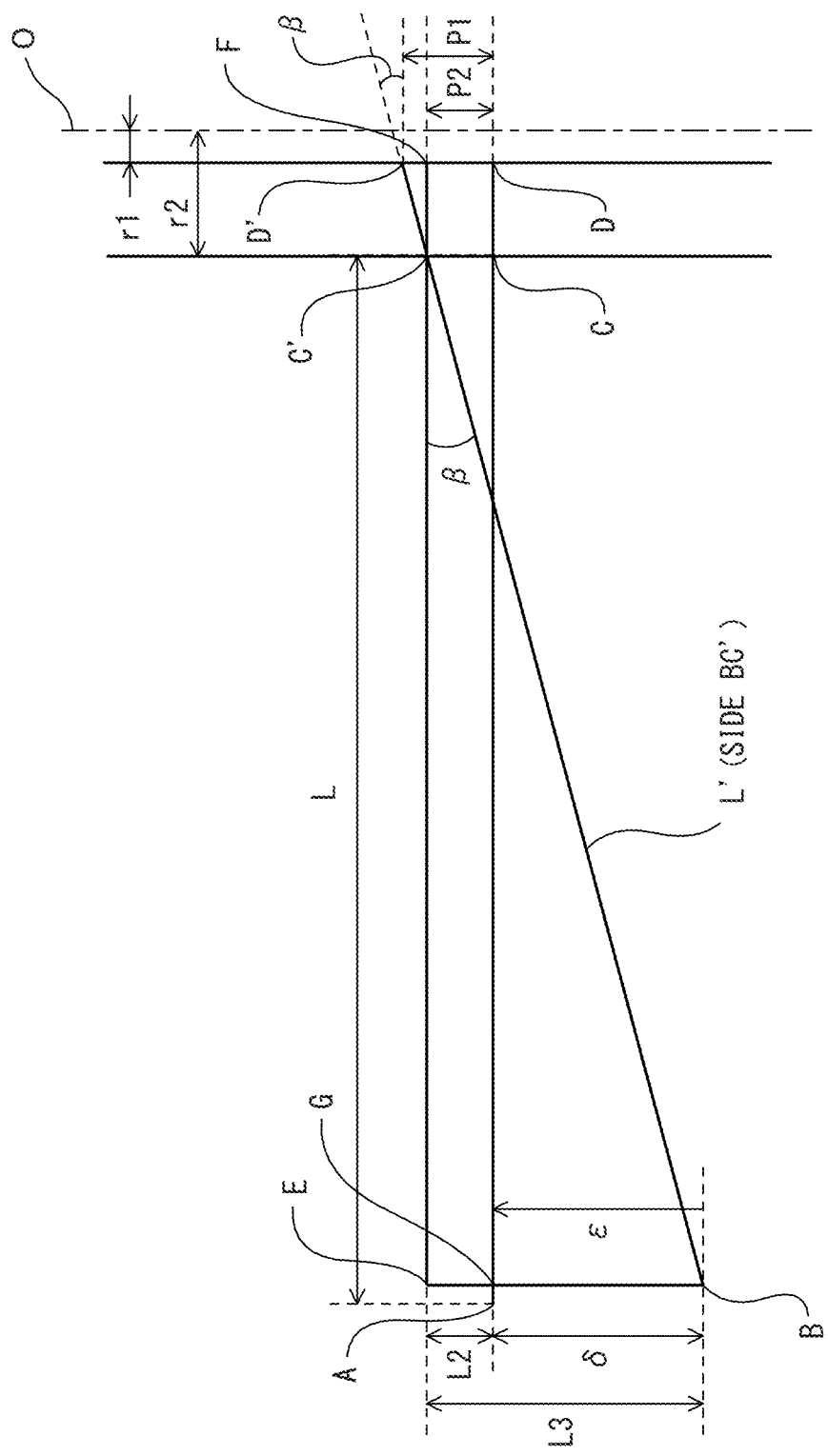
FIG. 8 is a geometric diagram showing a calculation example of link tip displacement.

FIG. 8 is a geometric diagram showing an example of calculation of the displacement δ of the link tip. First, the displacement detection sensor 20 stores the known values r1, r2, L and the scales of the two encoders 21, 22 prior to the application of the external force in a memory. The displacement detection sensor 20 then acquires the two positions P1, P2 by acquiring the scales of the two encoders 21, 22 after the application of the external force.

In FIG. 8, when a line segment EF which is parallel to the line segment AC, which connects the position A (the position of the fixed end of the base member) of the tip of the second link prior to application of the external force and the detection position C of the scale member, and which passes through the detection position C' of the scale member after the application of the external force is drawn, a perpendicular line BE from the position B of the fixed end of the base member after the application of the external force to the line segment EF is drawn, the intersection of the line segment AC and perpendicular line BE is defined as G, the length of line segment EG is defined as L2, and the length of perpendicular line BE is defined as L3, the displacement δ of the tip of the second link can be expressed by the following formula.

[Math 11]

$$\delta = L3 - L2 \qquad 11$$

When the angle ∠BC'E of the base member after the application of the external force is defined as β, and the length of the side BC' from the position B of the fixed end of the base member to the detection position C' of the scale member is defined as L', L3 can be expressed by the following formula.

[Math 12]

$$L3 = L' \times \sin\beta \qquad 12$$

Regarding L', since the distance between the scale member and the detector changes slightly after the application of the external force, when this amount of change is defined as ΔL, the length L' of the side BC' is expressed as L'=L+ΔL. Since ΔL is sufficiently smaller than L, it can be approximated as L'=L. Thus, L3 can be further expressed by the following formula.

[Math 13]

$$L3 = L \times \sin\beta \qquad 13$$

Since L2 is equal to the length from the detection position C of the scale member to the detection position C', it can be expressed by the following formula.

[Math 14]

$$L2 = P2 \qquad 14$$

When β, which is not a known value, is determined from formulas 13 and 14, the displacement δ of the tip of the second link can be determined. Focusing on ΔC'FD', β can be expressed by the following formula.

[Math 15]

$$\beta = a\tan\left(\frac{\text{Side } FD'}{\text{Side } C'F}\right) = a\tan\left(\frac{P1 - P2}{r2 - r1}\right) \qquad 15$$

Since r1, r2, P1, and P2 are known, the displacement δ of the tip of the second link can be determined.

When correcting the displacement δ of the tip of the second link, it is necessary to translate the second link from the position B to the position A along the axis O. When this linear position is defined as the correction amount c, the displacement calculation unit may further calculate the correction amount c for correcting the displacement δ of the tip of the second link. Since the correction amount c is equal to the displacement δ, it can be expressed by the following formula.

[Math 16]

$$\varepsilon = \delta \qquad 16$$

According to the above embodiment, the displacement of the tip of the machine 10 can be detected with high accuracy. The displacement of the tip of the machine 10 can be accurately corrected depending on various link connection structures.

It should be noted that the programs to be executed by the processor described above may be provided by recorded on a computer-readable non-transitory recording medium such as a CD-ROM, or alternatively, may be distributed and wired or wirelessly provided from a server device on a WAN (wide-area network) or LAN (local-area network).

Though various embodiments have been described herein, the present invention is not limited to the embodiments described above, and it should be understood that various changes can be made within the scope described in the claims.

DESCRIPTION OF REFERENCE SIGNS 1 control system
10 machine
11 first link
12 second link
13 motor
14 speed reducer
20 displacement detection sensor
21, 22 encoder
21a, 22a scale member
21b, 22b detector
23 base member
23a fixed end
23b free end
30 controller
31 memory
32 displacement calculation unit
33 operation command creation unit
O axis
δ displacement
ε correction amount
L distance from fixed end of base member to detection position of scale member
r1, r2 distance from axis to detection positions of scale members
θ1, θ2 two angles detected by two encoders
P1, P2 two positions detected by two encoders

The invention claimed is:

1. A displacement detection sensor, comprising:
two encoders which are attached to a first link and a second link, which are connected so as to be capable of moving relative to each other with respect to a predetermined axis, wherein
the two encoders comprise two scale members having different distances from the axis to a detection position, and two detectors for detecting respective scales of the two scale members, and
positional relationships between the scale members and the detectors change depending on external force received by a tip of the second link, causing a difference between the two scales detected by the two encoders, whereby displacement of the tip of the second link can be detected based on the two scales.

2. The displacement detection sensor according to claim 1, further comprising a base member which supports one of the detectors and the scale members, wherein the base member comprises a fixed end which is affixed to a tip of the second link, and a free end which is arranged at a joint between the first link and the second link and which is not constrained, one of the detectors and the scale members is attached to the free end, and the other of the detectors and the scale members is affixed to the first link.

3. The displacement detection sensor according to claim 2, further comprising a displacement calculation unit which calculates the displacement of the tip of the second link based on the two scales as well as two different distances from the axis to the detection positions of the two scale members, and distances from the tip of the second link to the detection positions of the scale members.

4. The displacement detection sensor according to claim 3, wherein the displacement calculation unit further calculates a correction amount depending on the displacement of the tip of the second link.

5. The displacement detection sensor according to claim 1, wherein the two encoders are rotary encoders which detect relative angles of the first link and the second link, which are connected so as to be capable of rotating about the axis.

6. The displacement detection sensor according to claim 1, wherein the two encoders are linear encoders which detect relative positions of the first link and the second link, which are connected so as to be capable of translating along the axis.

7. A controller which controls a machine comprising a plurality of links to which the displacement detection sensor according to claim 1 is attached, comprising an operation command creation unit which creates operation commands for the machine based on a correction amount depending on the displacement of the respective tips of the plurality of links.

8. The controller according to claim 7, further comprising a displacement calculation unit which calculates the displacement of the respective tips of the plurality of links based on the two scales as well as two different distances from the axis to the detection positions of the two scale members, and distances from the tip of the second link to the detection positions of the scale members.

9. The controller according to claim 8, wherein the displacement calculation unit further calculates, for each link, the correction amount depending on the displacement of the respective tips of the plurality of links.

10. A control system, comprising:
the displacement detection sensor according to claim 1,
a machine comprising a plurality of links to which the displacement detection sensor is attached, and
a controller for controlling the machine, wherein
the controller comprises an operation command creation unit which creates operation commands for the machine based on a correction amount depending on the displacement of the respective tips of the plurality of links.

* * * * *